(12) United States Patent
Tonucci et al.

(10) Patent No.: US 6,185,961 B1
(45) Date of Patent: Feb. 13, 2001

(54) NANOPOST ARRAYS AND PROCESS FOR MAKING SAME

(75) Inventors: Ronald J. Tonucci, Waldorf, MD (US); Paul P. Nguyen, San Jose, CA (US)

(73) Assignee: The United States of America as represented by the Secretary of the Navy, Washington, DC (US)

( * ) Notice: Under 35 U.S.C. 154(b), the term of this patent shall be extended for 0 days.

(21) Appl. No.: 09/237,927

(22) Filed: Jan. 27, 1999

(51) Int. Cl.$^7$ .................................................. C03C 17/00
(52) U.S. Cl. .............................. 65/60.4; 65/61; 250/207; 257/29; 257/443; 257/461
(58) Field of Search ..................... 65/30.1, 60.4, 65/30.11–30.14, 29.18, 61; 250/207; 257/29, 443, 461; 427/97, 98, 57, 77, 458, 527, 531

(56) References Cited

U.S. PATENT DOCUMENTS

| | | | |
|---|---|---|---|
| Re. 34,651 | * 6/1994 | Hoopman et al. | 428/586 |
| 3,331,670 | * 7/1967 | Cole | 65/411 |
| 3,628,933 | * 12/1971 | Kramer | 65/30.1 |
| 3,876,407 | * 4/1975 | Hirose et al. | 65/30.13 |
| 4,021,216 | * 5/1977 | Asam et al. | 65/403 |
| 4,101,303 | * 7/1978 | Balkwill | 65/31 |
| 4,125,640 | * 11/1978 | Conant et al. | 427/250 |
| 4,647,476 | * 3/1987 | Anthony | 427/97 |
| 4,853,020 | * 8/1989 | Sink | 65/393 |
| 5,159,231 | * 10/1992 | Feller et al. | 313/103 CM |
| 5,264,722 | * 11/1993 | Tonucci et al. | 257/443 |

* cited by examiner

*Primary Examiner*—Sean Vincent
(74) *Attorney, Agent, or Firm*—John J. Karasek; George A. Kap

(57) ABSTRACT

A nanopost glass array contains up to $10^{12}/cm^2$ of magnetizable nanoposts having diameter of 10–1000 nm that are straight and parallel to each other and are typically of a uniform diameter relative to each other and along the post length. The array is made using a reference electrode and a nanochannel glass template structure connected to each other electrically through an electrical source and both disposed in a plating solution. A magnetizable material is electroplated from the plating solution into the channels of the template structure.

18 Claims, 3 Drawing Sheets

NANOPOST ARRAYS AND PROCESS FOR MAKING SAME

BACKGROUND OF THE INVENTION

1. Field of the Invention

This invention pertains to nanopost arrays containing millions of nanosize posts per square centimeter and a process for making them from nanochannel templates.

2. Description of Related Art

Micromagnetic microscopy has been critical to both the physics and applications of micromagnetism. With the recent advent of new techniques, such as magnetic force microscopy and magnetic scanning near-field optical microscopy, the need for reliable and inexpensive submicron magnetic standards has grown stronger than ever before. Fabrication of large-scale nanopost arrays of ferromagnetic posts or wires and their application as magnetic standards and others is presented herein. Nanopost glass arrays made from the glass templates each containing more than several million nanometer-scale cylindrical channels that are parallel and uniform in diameter. The geometric placement of the channels in the template can be controlled to a high degree. The nanopost glass arrays can be utilized as nanosize magnetic standards, especially for dimensions smaller than 50 nm where no such standards, it is believed, are currently available. Also, the nanopost arrays can be used in any other application where parallel disposition and diameter uniformity of the nanoposts is desired.

Nanopost glass arrays have been fabricated previously by various techniques. To date, most of the non-template techniques are still in the developmental stage, are complicated, and expensive. Of the current non-template techniques, electron beam lithography is the most widely used since it offers control and planar pattern flexibility. Electron beam lithography, however, suffers serious disadvantages, including the high complexity and cost. Compared with parallel processes, such as the new technique discussed herein, the serial writing electron beam technique is many orders of magnitude slower. In addition, only very limited field, smaller than about 100×100 microns may be patterned each time, and because of thermal drift and mechanical vibration, it is virtually impossible to coherently stitch multiple fields together to fabricate very large periodic structures containing submicron features.

Closely related to electron beam lithography is X-ray lithography. As a parallel process, X-ray lithography is relatively fast. Nevertheless, because it uses electron beam lithography to write its masks, X-ray lithography faces the same problems that electron beam lithography suffers. Furthermore, X-ray sources and masks can be quite expensive. In fact, to date, interference lithography, i.e., the interference of two coherent beams of light to define a pattern, has been the only parallel technique capable of fabricating large, periodic arrays or gratings of nanoposts, or more accurately, nanowires, with high aspect ratios over 100 in a reasonably short time. All of the arrays produced by interference lithography, however, have been just one-dimensional, with high-aspect-ratio wires lying parallel to each other in a plane.

Previous alternative techniques for fabricating nanopost arrays using templates have also been limited by the lack of good templates. The templates commonly used included polycarbonate track-etched membranes and anodized aluminum, both of which suffer several disadvantages compared to the nanochannel glass templates. Polycarbonate track-etched membranes are made by shooting heavy ions through a dielectric material creating nuclear damage tracks. These tracks can be preferentially etched away to give hollow pores. The pores of the polycarbonate track-etched membranes, and hence their corresponding grown nanoposts, are non-parallel, non-uniform in diameter, placed randomly, often not even cylindrical, and occasionally cross paths in a high density structure.

Anodized aluminum templates are made by anodic oxidization of aluminum. Though better than polycarbonate track-etched membrane nanoposts, anodized aluminum nanoposts are only approximately parallel and cylindrical, and non-uniform in diameter.

Recently, carbon nanotubes have been used as templates or hosts to grow metallic nanoposts or nanowires by capillary action. Nanowires fabricated by this method, however, are curly, non-uniform in diameter, randomly distributed, and mostly discontinuous. In short, the non-uniformity of the previous templates has led to non-uniformity in the resulting ferromagnetic nanopost arrays, which consequently are not applicable for use as magnetic standards.

The nanochannel glass templates used herein provide a host matrix enabling simultaneous large scale complex patterning of nanometer sized elements or posts or wires with the accuracy and precision exceeding that of ion and electron beam writing. Such a glass template can contain or have a packing density of as many as about $10^{12}$ posts/cm$^2$ of varying configurations with the post diameters varying from less than 10 nm to micron size with aspect ratio of up to about 10,000. These glass templates have a thickness of about 2 microns to 5 mm, typically 20–500 microns, and temperature stability from about −272° C. to about +600° C.

The nanochannel glass template can be fabricated by starting with an elongated acid etchable glass rod, typically 25–50 mm in diameter and up to 100 cm long that is inserted into a hexagonal tube of inert glass that yields a snug fit. The cone/clad rod is fused under vacuum during a drawing process and drawn to fine filaments of 0.03–0.5 cm and cut to lengths of 30–90 cm. The filaments are stacked into bundles nearly 3.5 cm flat to flat, drawn and restacked and redrawn until the desired tube diameter is achieved. Just before the final draw, a cladding can be added for strength and to facilitate handling by placing the bundle inside a hollow tube and drawing under vacuum. To relieve stress, the glass is annealed after each draw. The glass is then cut to the desired lengths, polished and etched in a weak acid, such as 1% HCl or HNO$_3$ or acetic acid, to remove the etchable glass used and leave behind the clad nanochannel glass template. The Tonucci et al U.S. Pat. No. 5,264,722 gives more details pertaining to fabrication, more complex structures and other aspects of the nanochannel glass templates.

OBJECTS AND BRIEF SUMMARY OF THE INVENTION

It is an object of this invention to reliably and reproducibly deposit by electroplating a material in channels of a nanochannel glass template in an inexpensive manner.

It is another object of this invention to fabricate a nanopost glass array by a parallel process that is simple, inexpensive, and fast.

It is another object of this invention to fabricate a large scale nanopost glass array exceeding about 10 cm$^2$ in the manner described herein.

It is another object of this invention to efficiently deposit a magnetic material in the channels of a nanochannel glass template by electroplating the magnetic material from a plating solution into the channels.

Another object of this invention is a large scale nanopost glass array containing a plurality of high aspect ratio regularly arranged magnetizable nanoposts that are parallel to within a fraction of a degree and of a uniform diameter.

These and other objects of this invention are accomplished by providing a thin film of a metal on one side of a nanochannel glass template whereby the channels are closed off at one end thereof, providing an electrical connection to the thin film, electrically isolating the thin film and the electrical connection to form a template structure, placing the template structure into a plating solution containing a plating material and depositing the material from the plating solution in the nanochannels of the template under the influence of an electromotive force.

DETAILED DESCRIPTION OF THE INVENTION

Figure 1:
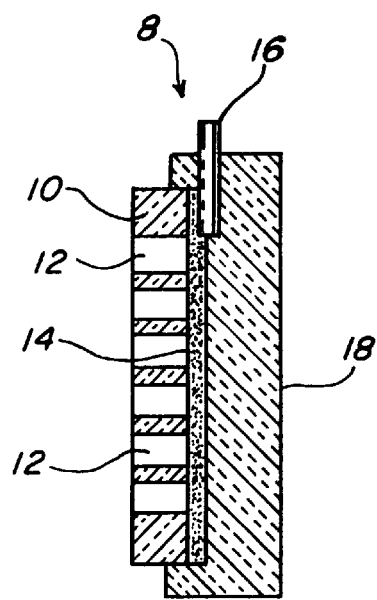
FIG. 1 is a schematic illustration of a nanochannel glass template structure devoid of cover slip wherein one side of a nanochannel glass template has an electrically conducting film and an electrical connection thereto, all encased in an electrically insulating material.

This invention pertains to a nanopost glass array and to a process for its preparation. The nanopost glass array is a nanochannel glass template containing up to $10^{12}$ essentially parallel nanoposts or wires per square centimeter of varying pattern configuration with the post diameters, assuming the posts are essentially cylindrical, varying in diameter from about 10 nm to micron size, with aspect ratio of up to about 10,000 and center-to-center spacing of the posts of up to about 30 diameters to less than 0.5 diameter. Typically, the unit contains $10^6$–$10^{11}$ essentially parallel posts per square centimeter which are 10–1000 nm in diameter with aspect ratio of 10–1000 and spacing of 0.5–20 diameters. For a nanopost glass array about 2.5 cm in diameter containing about 170 nm posts arranged in a square lattice with a post-to-post spacing of 5 post diameters, the number of posts is about $10^9$. The post diameters in an array are typically uniform to within a few or about 2% in both channel diameter and position in the array. The posts are typically parallel to each other to within a fraction of one degree.

It is possible to intentionally vary the spacing and post diameters independently whereby the spacing of post diameters are not uniform within a few percent both among the posts and along the length of each post but vary within the parameters specified herein. Applications for arrays containing regularly spaced large and small posts include course and fine calibrations in the same sample.

The post material is such that it can be deposited in the channels of the nanochannel glass template by electroplating. The post material is electrically conducting and is magnetizable. Specific examples of post materials are ferromagnetic materials such as iron, nickel, and cobalt. Generally, certain materials can spontaneously magnetize into single domain nanowires if diameter thereof is less than about 100 nm.

Because the nanopost arrays of this invention have a plurality of nanoposts which are essentially parallel and of a uniform diameter and spacing, the units are particularly suitable for use in micromagnetic microscopy as submicron magnetic standards for calibration and other purposes. Since geometric placement of the channels in a template can be controlled to high tolerance, the nanopost glass arrays of this invention can be used as nanosize magnetic standards especially for dimensions smaller than about 10 nm and particularly for dimensions of about 50 nm for calibration and other purposes.

Reliable and inexpensive need for magnetic standards disclosed herein is particularly timely with the advent of magnetic force microscopy and magnetic scanning near field optical microscopy. The magnetic force microscopy is typically used to measure local magnetic field and the smallest feature size that can be detected is about 50 nm, using a magnetic force microscope from a commercial source. The magnetic near-field optical microscopy relies on the use of optics to determine dimensions that are a very small fraction of the light wave down to about 50 nm.

Other uses for the magnetic standards disclosed herein include magnetic recording in general, including floppy and hard disks for computer use.

The term "mesoscopic" pertains to a size regime intermediate between microscopic and macroscopic that is characteristic of a region where a large number of particles can interact in a quantum-mechanical fashion.

The process for fabricating a nanochannel glass array is a parallel process where the channels of a nanochannel glass template are filled with a material simultaneously rather than sequentially. The process is commenced with a nanochannel glass template that contains up to $10^{12}$ parallel nanochannels per square centimeter of varying pattern configurations with the channel diameters from less than 10 nm to 1 micron having aspect ratio of up to about 10,000 and center-to-center spacing between the posts of up to 30 diameters. One side of the template is provided with a film of an electrically conducting material which, under influence of an electromotive force, can move material into the channels of the template. The side of the template that is covered with the conducting material is perpendicular to the disposition of the channels and the coating is a thin film on the order of up to about one micron in thickness, typically 0.1–1 micron, more typically 0.1–0.5 micron. The material applied to one side of the template is electrically conducting thin film and is typically a metal such as platinum, palladium, gold, nickel, chromium or copper. The metal can be deposited on the template by any means including thin film sputtering, thermal evaporation, and electron-beam evaporation.

The thin film coating applied to the template should not be too thick or too thin and should have sufficient adhesion to stick to an etched and cleaned glass surface in an acidic environment. If the coating is too thick, it may crack or peel; and if the coating is too thin, it may not work because the channels in the template are not sufficiently covered for electroplating. Although gold, copper, nickel, silver, and palladium have been tried, it appears that thin film chromium covered with gold works best.

An electrical connection is then established with the film coating by securing a metal wire or strip thereto and leading the strip or wire outside where it might be connected to an electrical source. The material and the electrical connection are then electrically isolated by any means possible, typically by applying an electrically non-conducting substance around the electrically conducting material and the connector. A cover slip, made of an electrically non-conducting material with a hole in it, larger or smaller than the template, can be used to facilitate electrical isolation of the template, and to assure that during electroplating, deposition of the material is made directly in the nanochannels of the template and not elsewhere.

FIG. 1 shows nanochannel glass template structure composed of nanochannel glass template 10, nanochannels 12 in the template passing through the template from one end to the other, sputtered thin film coating 14 disposed on the back side of the template and blocking one end the of the channels, electrical connector 16 connected to the thin film coating and leading outwardly with respect to the thin film coating, and insulating material 18 enveloping the back side of the template on which the thin film and the connector are disposed. The insulating material electrically insulates the thin film coating and the connector on the back side of the template and allows electrical contact with the thin film through the open end of the channels in the template.

In accordance with the object of the process to fill the channels in the template with an electrically conducting material, the nanochannel glass template structure shown in FIG. 1, having attached thereto a glass cover slip by an adhesive, is placed into a plating solution and the channels are filled with the conducting material derived from the plating solution on application of an electromotive force.

Figure 2:
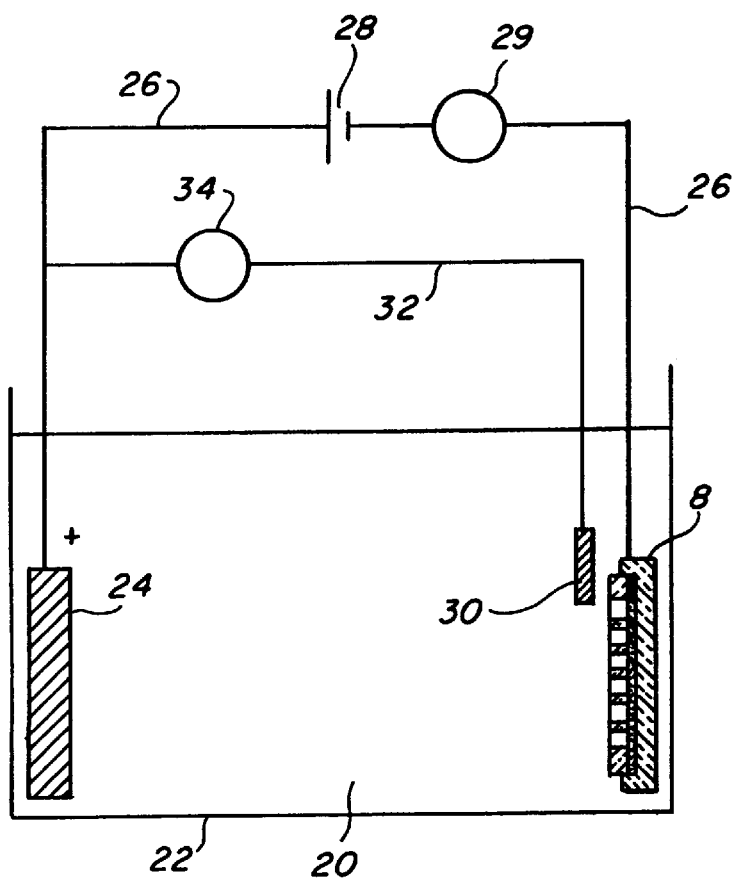
FIG. 2 is a schematic illustration of an electroplating bath containing a counter electrode, a reference electrode, and a nanochannel glass template structure devoid of cover slip adapted to deposit a material from the plating bath in the nanochannels of the template.

The electroplating apparatus which can be used to deposit material from the electroplating solution into the nanochannels of the glass template is shown in FIG. 2 where the nanochannel glass template structure 8 devoid of the cover slip is shown submerged in electroplating liquid solution 20. The electroplating solution is disposed within container 22, which can be a glass beaker. Counter electrode 24, typically made of a noble metal, is disposed generally opposite to and spaced from the nanochannel glass template structure 8 at opposite end of container 22, as shown in FIG. 2. Counter electrode 24 is electrically connected to the coating 14 of the nanochannel glass template structure 8 by means of line 26 through electrical power source 28 which is used to apply electromotive force between the counter electrode and the thin film coating 14 of the nanochannel glass template structure 8 in the form of a voltage differential which serves to drive certain material from the plating solution into the channels of the nanochannel glass template structure. Amp meter 29 is typically placed in line 26 to monitor the applied voltage.

Any electroplating solution can be used to deposit efficiently material in the channels of the nanochannel glass template structure. Suitable plating solutions that can deposit a ferromagnetic material in the channels of a nanochannel glass template provided with a metallic backing can be readily purchased commercially or be custom-made. If a glass receptacle is used for the plating solution, it must not react with the glass too much. For instance, cobalt can be electrodeposited from a plating solution composed of 252 g/l $CoSO_4 \cdot 7H_2O$, 7 g/l NaCl, and 50 g/l $H_3BO_3$, which solution has acidic pH of 3.6.

Electrodeposition can be monitored by following the current displayed by the optional reference electrode. The reference electrode can be of the same material as the counter electrode, but need not be. Reference electrode 30 is electrically connected to counter electrode 24 by means of line 32 connected to line 26 and the reference electrode 30. Voltmeter 34 in line 32 can be used to check on the voltage in the circuit, and the ammeter 29 can be used to check on the current in the electroplating solution.

With the nanochannel glass template structure having a cover slip attached thereto, the counter electrode, the reference electrode, the plating solution at room or ambient temperature, and the other components in place, as shown in FIG. 2, the electroplating process is commenced by impressing a voltage differential by means of voltage source 28 in line 26, on the counter electrode and the thin film coating on the nanochannel glass template structure in order to drive metal cations from the electroplating solution into the nanochannels. Typically, the voltage applied by voltage source 28 is a fixed voltage of 1–6 volts. Depending on many factors, the electroplating process typically takes 1–20 hours, more typically 2–10 hours, whereby the channels are filled with the material. If the applied voltage is too low, no electroplating will take place and the channels will remain empty. Deposition in the channels may be too slow if the applied voltage is low. If the applied voltage is too high, deposition of the material in the channels will take place quickly and it is imperative to discontinue the electroplating process to avoid over filling the channels and forming a layer of the material on the opposite side of the template on which coating 14 is deposited. If the applied voltage is too high and deposition of the material is too fast, granular or porous, non-smooth posts may be produced.

After completing the electroplating process, voltage at voltage source 28 is cut-off and the nanochannel glass template structure is removed. The glass cover slip is disengaged and the nanochannel glass template structure devoid of the slip is lapped and polished to obtain a smooth surface with regularly spaced posts disposed in the channels. Roughness of the smooth surface of less than 0.2 channel diameter is desired. Typically, roughness of the smooth surface is less than 0.1–0.01 channel diameter.

Having described the invention, the following examples are given as particular embodiments thereof and to demonstrate the practice and advantages thereof. It is understood that the examples are given by way of illustration and are not intended to limit the specification or the claims in any manner.

EXAMPLE 1

This example demonstrates preparation of a nanochannel glass array using the electroplating apparatus of FIG. 2 wherein posts in the channels were made of nickel and had diameter of 250 nm.

Pursuant to the procedure described herein, a nanochannel glass template containing 250 nm diameter nanochannels in a hexagonal pattern was prepared by drilling a hole about 2 mm in diameter in a glass cover slip measuring about 18 mm×18 mm×150 $\mu$m and securing a polished and etched nanochannel glass template in the hole by means of 5-minute epoxy. One side of the nanochannel template was metallized by sputtering a thin film of platinum about 100 microns thick to establish an electrical connection. A metallic wire was connected to the thin film, as shown in FIG. 1, and the thin film and the wire were then electrically isolated by 5-minute epoxy by plastering the epoxy around the thin film and the wire, in the manner schematically shown in FIG. 1, to form a nanochannel glass template structure that is a nanochannel glass template that may have a slip attached thereto and a thin metal film with an electrical connection attached thereto on one side thereof which is perpendicular to the channels therein.

The nanochannel glass template structure was placed into 250 ml of commercial nickel sulfamate plating solution, obtainable from Technic, Inc., contained in a 500 ml glass beaker. The glass beaker also contained the counter electrode and the reference electrode. The counter electrode was disposed in the plating solution at one end of the beaker and the glass structure was also disposed in the plating solution in the beaker at opposite end thereof with respect to the reference electrode. The counter electrode was a platinum disk 1 cm in diameter and about 1 mm thick. The reference electrode was also disposed in the plating solution in the vicinity of the glass structure. The counter electrode was connected to the glass structure by means of a circuit connected to a voltage source and the reference electrode was connected to the counter electrode circuit. An amp meter was provided in the counter electrode circuit and a voltmeter was provided in the reference electrode circuit. The electrical connections between components of the plating apparatus and relative dispositions thereof are as schematically illustrated in FIG. 2.

When electromotive force of about 6 volts from the voltage source was established in the plating solution, plating nickel cations were generated by the plating solution and were impelled by the electromotive force to move into the channels of the nanochannel glass template structure. The electrodeposition process of the nickel ions was continued for about 6 hours until the channels were filled with nickel. At that point, the process was terminated by turning-off the voltage source, and the glass structure was removed from the plating solution, the cover slip was also removed by solubilizing the epoxy adhesive, and the other side of the structure was polished to obtain a smooth surface.

Figure 3:
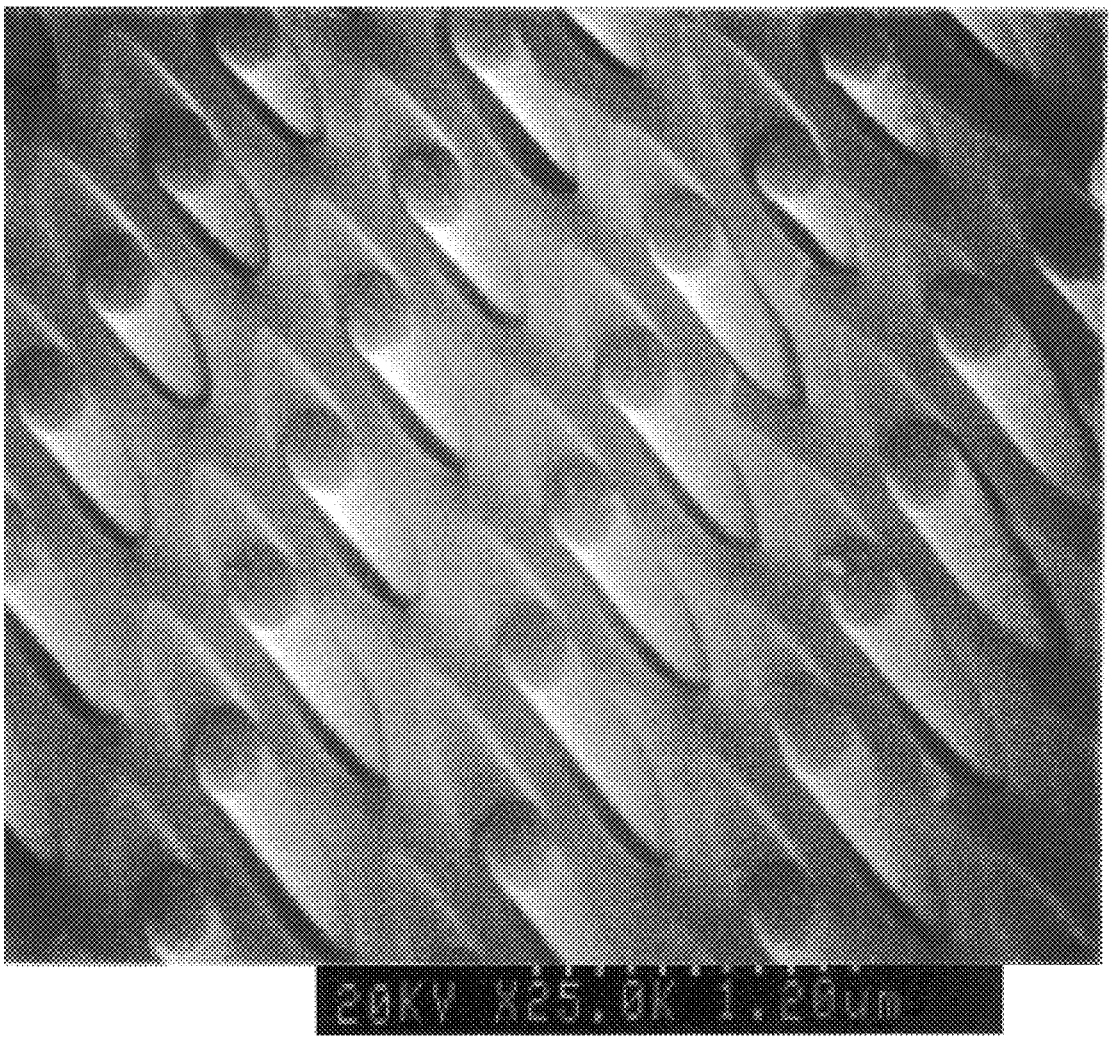
FIG. 3 is a drawing representation of a scanning electron microscope image of an angular cross-sectional area of a nanopost glass array with nickel nanoposts 250 nm in diameter.

What was obtained was a nanopost glass array wherein channels of the template contained smooth nickel posts 250 nm in diameter in a hexagonal pattern with a spacing between the posts of 125 nm or a center-to-center disposition of 375 nm. The posts were parallel to each other to within a fraction of a degree and were arranged regularly in a two-dimensional hexagonal array. The posts were highly cylindrical and had diameters uniform to a few percent both among the posts and along the post lengths. FIG. 3 is a drawing representation of scanning electron microscope images of the nanochannel glass array of this example at an angular cross-section showing the nickel posts.

EXAMPLE 2

This example demonstrates preparation of a nanochannel glass array using the electroplating apparatus of FIG. 2 wherein posts in the channels were made of cobalt and had diameter of 80 nm. The nanochannel glass template was about 19 mm diameter and the hole drilled into the glass cover slip was about 0.5 mm in diameter.

After mounting the nanochannel glass template over the hole in the glass cover slip with 5-minute epoxy, a chromium film 200 nm thick was sputtered onto one side of the glass template and a wire connection was secured to the chromium film. More of the 5-minute epoxy was used to electrically isolate the sputtered side. The counter electrode was still the same as in Ex. 1, as was the reference electrode. Homemade plating solution of pH of 3.6 was 252 g/l $CoSO_4.7H2O$, 7 g/l NaCl, and 50 g/l $H_3 BO_3$.

The electrodeposition process was carried out at around 1.8 volts in about 4 hours using the plating apparatus of FIG. 2 and in the manner described in Ex. 1, above.

Figure 4:
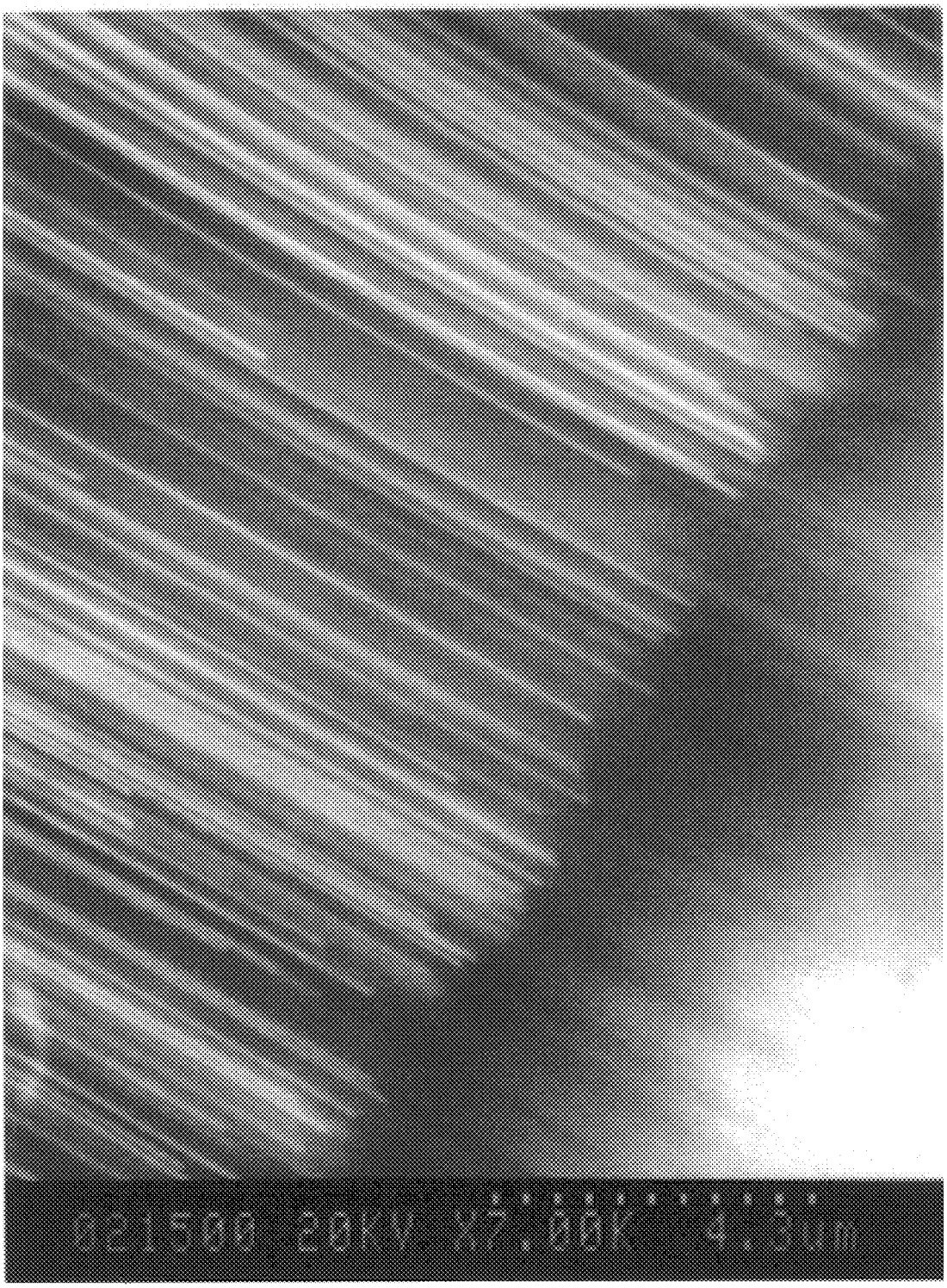
FIG. 4 is a drawing representation of a scanning electron microscope image of a cross-sectional area of a nanopost glass array containing cobalt posts 80 nm in diameter disposed in nanochannels of a nanochannel glass template.

A nanochannel glass array was obtained with cobalt posts having diameters of 80 nm. The hexagonally patterned posts were straight, parallel, and had aspect ratio of about 300:1. FIG. 4 is a drawing representation of a scanning electron images of a cross-section of the nanochannel glass array of this example.

While presently preferred embodiments have been shown of the novel nanochannel glass array and process for its preparation, and of the several modifications discussed, persons skilled in this art will readily appreciate that various additional changes and modifications may be made without departing from the spirit of the invention as defined and differentiated by the following claims.

What is claimed is:

1. A process comprising the step of depositing from a plating solution a material into channels of a glass template to form an array containing up to $10^{12}$ of elongated structures per square centimeter having diameter of about 10 nm to micron size with aspect ratios of up to 10,000.

2. The process of claim 1 wherein the array contains $10^6$–$10^{11}$ of the elongated structures per square centimeter which are cylindrical posts 10–1000 nm in diameter, the posts are essentially uniform along the length of the post, with spacing between the posts of 0.5–20 post diameters.

3. The process of claim 2 including the steps of providing a metallic coating at one end of the template to form a template structure, before the depositing step, so as to block the ends of the channels disposed in the template, and electrically isolating the coating before the depositing step.

4. The process of claim 3 including the steps of passing an electromotive force through the plating solution wherein are disposed, in spaced relationship, the template and a counter electrode which is effective in moving the material from the plating solution into the channels.

5. The process of claim 4 wherein a connection electrically connects the coating to the counter electrode and the connection has an electrical source to provide the electromotive force.

6. The process of claim 5 including the step of imparting a sufficient voltage differential between the coating and the counter electrode for a duration of 1–20 hours to deposit the material from the plating solution into the channels and thus form a nanochannel glass array.

7. The process of claim 6 wherein the voltage differential is 1–10 volts and the duration is 2–10 hours.

8. The process of claim 7 including the steps of removing the template structure from the plating solution, polishing the template structure to form a smooth surface perpendicularly to disposition of the posts.

9. The process of claim 8 including the step of monitoring current in the plating solution during plating deposition with a reference electrode electrically connected to the counter electrode.

10. A nanopost glass array made by the process of claim 7 containing posts in the channels, the posts have cylindrical diameters that are uniform to within about 5% along their post lengths.

11. A mesoscopic nanopost glass array made by the process of claim 2 containing posts in the channels which are magnetizable and which are parallel to each other to within less than one degree and have uniform diameters to within about 2% of each other and along their post lengths.

12. In a process for making a nanopost glass array from a nanochannel glass template containing up to $10^{12}/cm^2$ of nanochannels having diameters of 10–1000 nm that are parallel to each other to within less than one degree and which channels are of a uniform diameter and have a uniform geometric placement to within 5 percent relative to each other and along the channel length, the channels are disposed perpendicularly between two faces of the template and the template being disposed in a plating solution and spaced from a counter electrode which is also disposed in the plating solution and electrically connected to the template across a voltage source, the process comprising the step of providing sufficient electromotive force in the plating solution to deposit a material from the plating solution into the template channels in less than 20 hours to form the nanopost glass array.

13. The process of claim 12 wherein the electromotive force is voltage differential between the positive counter electrode and the coating of 1–10 volts and duration of deposition of the material into the template channels is 2–10 hours.

14. The process of claim 13 including the steps of removing the nanopost glass structure with the cover slip attached thereto from the plating solution and polishing the structure on its other face to obtain a smooth surface.

15. The process of claim 14 wherein the plating solution has an acid pH and consists essentially of 252 g/l $CoSO_4.7H_2O$, 7 g/l NaCl, and 50 g/l $H_3BO_3$.

16. A nanopost glass array made by the process of claim 12 containing posts in the channels, the posts are uniform in diameter to within about 2 percent along the post length.

17. A nanopost glass array made by the process of claim 13 containing cylindrical posts which are parallel to each other to within less than one degree and have a uniform diameter to within about 5% of each other along the post length and among the posts.

18. The nanopost glass array of claim 17 wherein the posts are mesoscopic, smooth to within 0.1–0.01 channel diameter, are made of a magnetizable material, and are stable in the temperature range of about −270° C. to about +600° C.

* * * * *